United States Patent
Aoki et al.

(10) Patent No.: US 7,414,810 B2
(45) Date of Patent: Aug. 19, 2008

(54) MAGNETIC HEAD STRUCTURE WITH INSULATING LAYER CONFIGURED TO REDUCE THERMAL DEFORMATION OF FLOATING SURFACE TOWARDS DISK

(75) Inventors: Kenichiro Aoki, Kawasaki (JP); Toshinori Hoshino, Kawasaki (JP); Toshiyuki Nakada, Kawasaki (JP); Keiji Aruga, Kawasaki (JP); Hiroshi Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 10/925,564

(22) Filed: Aug. 25, 2004

(65) Prior Publication Data

US 2005/0219749 A1   Oct. 6, 2005

(30) Foreign Application Priority Data

Mar. 30, 2004 (JP) .............................. 2004-099055

(51) Int. Cl.
*G11B 5/23* (2006.01)
*G11B 5/235* (2006.01)

(52) U.S. Cl. ................................. 360/123.25

(58) Field of Classification Search ................ 360/125, 360/126, 123.25, 123.28, 123.29, 123.33, 360/123.46, 123.49, 123.5, 123.52, 123.53, 360/123.54, 123.71, 123.72, 123.73, 125.75
See application file for complete search history.

(56) References Cited

U.S. PATENT DOCUMENTS

| | | | |
|---|---|---|---|
| 5,949,627 A | 9/1999 | Williams et al. | 360/126 |
| 6,166,880 A | 12/2000 | Kobayashi et al. | 360/126 |
| 6,414,818 B1 | 7/2002 | Tanimoto et al. | 360/126 |
| 6,507,455 B1 | 1/2003 | Kikuiri et al. | 360/123.2 |
| 6,538,845 B1 | 3/2003 | Watanabe et al. | 360/126 |
| 6,654,202 B2 | 11/2003 | Rea et al. | 360/123 |
| 6,950,279 B2 | 9/2005 | Sasaki et al. | 360/125.5 |
| 2003/0099054 A1 | 5/2003 | Kamijima | 360/59 |
| 2004/0008451 A1 | 1/2004 | Zou et al. | 360/317 |
| 2004/0051996 A1 | 3/2004 | Kautzky et al. | 360/123 |

FOREIGN PATENT DOCUMENTS

| | | |
|---|---|---|
| JP | 63108516 | 5/1988 |
| JP | 2000132803 | 5/2000 |
| JP | 2000306213 A | 11/2000 |
| JP | 2000306215 A | 11/2000 |
| JP | 2003-091802 | 3/2003 |
| JP | 2003168274 | 6/2003 |

*Primary Examiner*—Julie Anne Watko
(74) *Attorney, Agent, or Firm*—Greer, Burns & Crain, Ltd.

(57) ABSTRACT

A magnetic head structure has a coil and a magnetic pole allowing a magnetic flux generated by the coil to be transmitted therethrough and forming a magnetic gap. An insulating layer surrounds the coil, and a protective layer covers the insulating layer and the magnetic pole. The insulating layer has a volume equal to or greater than a value which is determined with respect to a thickness of the protective layer. It is preferable to increase the volume of the insulating layer as the thickness of the protective layer is made greater. By increasing the volume of the insulating layer, the protrusion of a portion of a floating surface of the magnetic head slider near the magnetic pole, toward the disk, is reduced.

3 Claims, 13 Drawing Sheets

MAGNETIC HEAD STRUCTURE WITH INSULATING LAYER CONFIGURED TO REDUCE THERMAL DEFORMATION OF FLOATING SURFACE TOWARDS DISK

BACKGROUND OF THE INVENTION

1. Field of the Invention

The present invention relates to a magnetic head structure.

2. Description of the Related Art

A magnetic disk apparatus includes a plurality of disks and a plurality of magnetic head structures arranged between the disks. The magnetic head structure is arranged in a magnetic head slider. The surface of the magnetic head slider facing the disk is called a floating surface. The magnetic head structure comprises a coil, a magnetic pole allowing a magnetic flux generated by the coil to be transmitted therethrough and forming a magnetic gap, an insulating layer surrounding the coil, and a protective layer covering the insulating layer and the magnetic pole, with these members being provided on a substrate forming the magnetic head slider. Also, a shield and a reading element (MR element) are arranged on the substrate.

When data are written into the disk, an electric current is supplied to the coil. The electric current flowing through the coil generates a magnetic flux, and the magnetic flux leaking in the magnetic pole writes data in the disk. Also, when data are read from the disk, data is read by the MR element. Recently, the flying height (amount of the floating) of the magnetic head slider has been reduced in order to increase the recording density, and the flying height is ten and several nm, for example.

In the magnetic head structure, the substrate is made of $Al_2O_3$—TiC, the coil is made of copper, the magnetic pole and the shield are made of a magnetic material such as NiFe, the protective layer is made of alumina, and the insulating layer is made of a resin material such as a photoresist. In this manner, the whole magnetic head structure is covered by a protective layer made of alumina, and the coil and the insulating layer, which have coefficients of thermal expansion different from that of the protective layer, are arranged within the magnetic head structure.

The coefficient of thermal expansion of alumina is $5.8 \times 10^{-6}$, the coefficient of thermal expansion of copper is $17.2 \times 10^{-6}$, the coefficient of thermal expansion of Permalloy as a magnetic material is $10 \times 10^{-6}$, and the coefficient of thermal expansion of a photoresist is $30\text{-}70 \times 10^{-6}$. The coefficient of thermal expansion of copper or a magnetic material is approximately two or three times greater than that of alumina. The coefficient of thermal expansion of photoresist is approximately 10 times greater than that of alumina.

When the temperature of the interior in the magnetic disk apparatus rises or when the temperature rises due to the supply of the electric current, thermal deformation may occur in the magnetic head structure due to the difference in coefficients of thermal expansion of the constituent materials of the magnetic head structure. Such thermal deformation may cause deformation of the floating surface.

In considering the deformation in the floating surface, the insulating layer comprising a photoresist and having the greatest coefficient of thermal expansion expands to the greatest degree, and therefore, such a phenomena occurs that a portion of the floating surface where the magnetic pole protrudes toward the disk. If the deformation in the floating surface occurs, the minimum amount of the floating of the magnetic head slider is substantially reduced, and it is possible that a portion of the floating surface near the magnetic pole contacts the disk, and the reliability may be reduced.

Therefore, it is desirable to reduce the protrusion of the portion of the floating surface near the magnetic pole toward the disk.

Conventionally, there is a proposal to reduce the protrusion of the portion of the floating surface near the magnetic pole toward the disk, by changing the materials of the insulating layer and the protective layer. For example, the protective layer is divided into two portions, in which a material having higher Young's modulus is used for the portion near the floating surface and a material having lower Young's modulus is used for the portion remote from the floating surface (refer to Japanese Unexamined Patent Publication (Kokai) No. 2000-306213, for example). Also, these is a proposal to use a resin having a lower glass transition temperature for the insulating layer (refer to Japanese Unexamined Patent Publication (Kokai) No. 2000-306215, for example). However, as there is a large difference between coefficient of thermal expansion of the protective layer and that of the insulating layer, as described above, the problems of the thermal deformation cannot be fundamentally solved even if a difference between coefficient of thermal expansion of the protective layer and that of the insulating layer is slightly reduced.

SUMMARY OF THE INVENTION

The object of the present invention is to provide a magnetic head structure by which the protrusion of a portion of a floating surface near a magnetic pole toward a disk can be reduced.

A magnetic head structure, according to the present invention, comprises a coil, a magnetic pole allowing a magnetic flux generated by the coil to be transmitted therethrough and forming a magnetic gap, an insulating layer surrounding the coil, and a protective layer covering the insulating layer and the magnetic pole, wherein the insulating layer has a volume equal to or greater than a value which is determined with respect to a thickness of the protective layer.

In this arrangement, it is possible to reduce the protrusion of a portion of a floating surface near a magnetic pole, toward a disk, by increasing the volume of the insulating layer to more than a certain value. It will be usually conceived that the amount of the thermal expansion may increase when the volume of the insulating layer is increased, so that the amount of the protrusion of a portion of a floating surface near a magnetic pole toward a disk will be increased. The inventors of the present application have found that the expansion of the insulating layer in the high temperature state occurs not only in the direction toward the floating surface but also in the direction transverse to the floating surface. If the volume of the insulating layer is increased, a component of the insulating layer, which expands in the direction transverse to the floating surface, locally presses upward the protective layer located above the insulating layer, so that a moment, which causes a portion of the protective layer on the side of the floating surface to rotate, occurs. By this moment, the outer edge of the floating surface deforms toward the disk and the protrusion of a portion of a floating surface near a magnetic pole toward a disk is restricted. Therefore, by increasing the volume of the insulating layer having a greater coefficient of thermal expansion, it is possible to reduce the protrusion of a portion of a floating surface near a magnetic pole toward a disk. Also, it is necessary to increase the volume of the material of the insulating layer as the thickness of the protective layer covering the insulating layer is greater, in order to deform the protective layer to reduce the protrusion of a portion of a floating surface near a magnetic pole toward a disk.

A magnetic head structure, according to the present invention, comprises a coil, a magnetic pole allowing a magnetic flux generated by the coil to be transmitted therethrough and forming a magnetic gap, an insulating layer surrounding the coil, and a protective layer covering the insulating layer and the magnetic pole, wherein the coil has an inner coil part and an outer coil part and the width of the outer coil part is greater than two times the width of the inner coil part.

In this arrangement, the coil has a wider portion (the outer coil part), and the resistance of the coil is reduced. As the resistance of the coil is reduced, the amount of the heat generated by the coil is reduced, and as a result, the amount of the expansion of the insulating layer is reduced and the thermal deformation of the magnetic head structure is also reduced. Therefore, it is possible to reduce the protrusion of the portion of the floating surface, near the magnetic pole, toward the disk.

A magnetic head structure, according to the present invention, comprises a coil, a magnetic pole allowing a magnetic flux generated by the coil to be transmitted therethrough and forming a magnetic gap, an insulating layer surrounding the coil, a protective layer covering the insulating layer and the magnetic pole, and a material layer arranged in or on the protective layer and having coefficient of thermal expansion smaller than that of the protective layer.

In this arrangement, the material layer having coefficient of thermal expansion smaller than that of the protective layer suppresses the thermal expansion of the whole magnetic head structure, and therefore, it is possible to reduce the protrusion of a portion of a floating surface, near a magnetic pole, toward a disk.

BRIEF DESCRIPTION OF THE DRAWINGS

The present invention will now be explained with reference to the accompanying drawings, in which.

DESCRIPTION OF THE PREFERRED EMBODIMENTS

Figure 1:
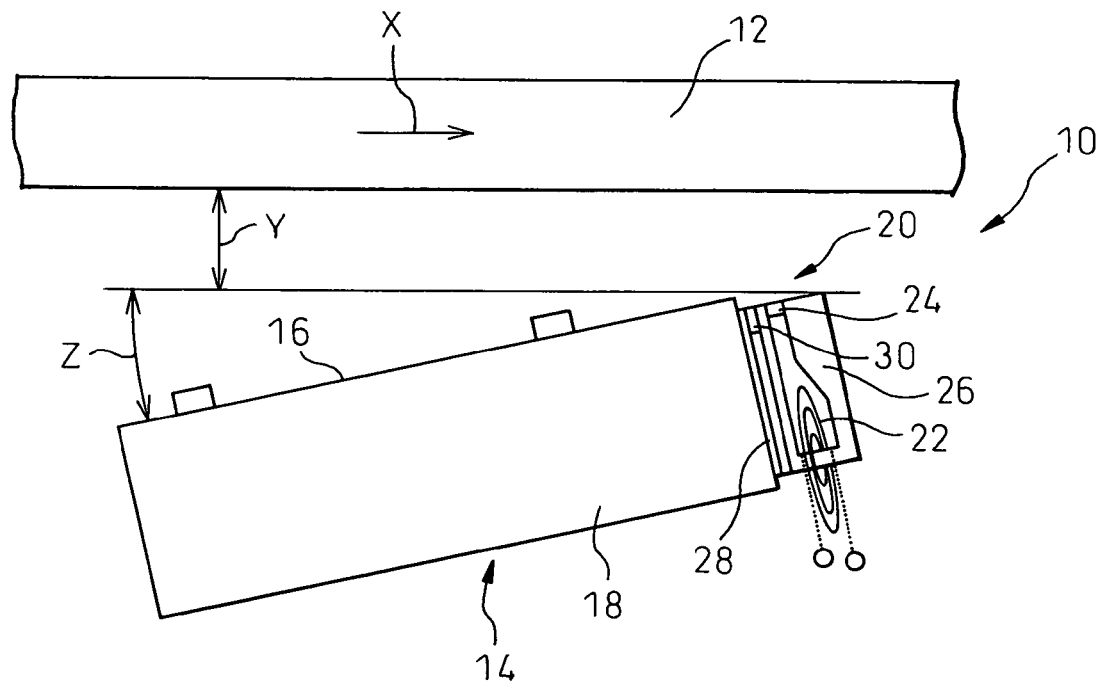
FIG. 1 is a schematic view illustrating a part of a magnetic disk apparatus according to an embodiment of the present invention.
Figure 2:
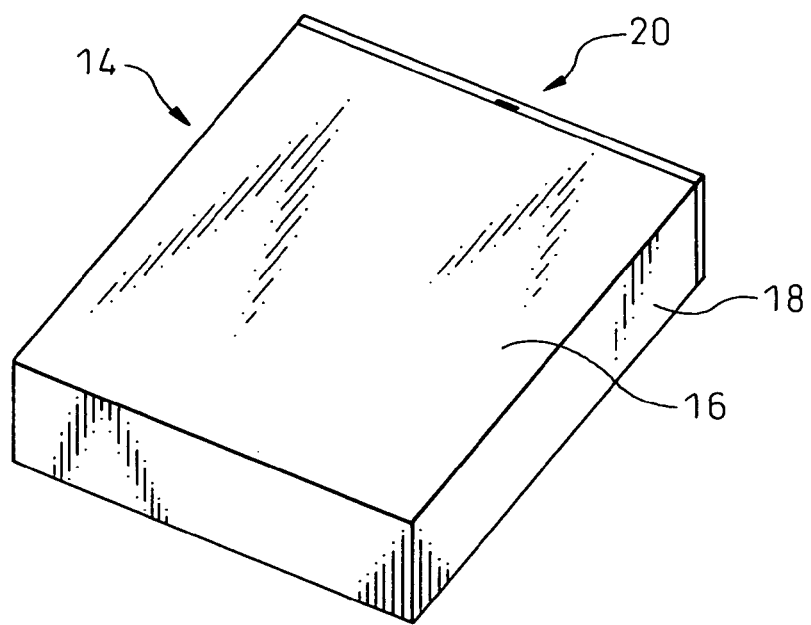
FIG. 2 is a perspective view illustrating the magnetic head slider.

The preferred embodiment of the present invention will now be explained with reference to the accompanying drawings. FIG. 1 is a schematic view illustrating a part of a magnetic disk apparatus according to an embodiment of the present invention. FIG. 2 is a perspective view illustrating the magnetic head slider.

The magnetic disk apparatus 10 includes magnetic disks 12 and magnetic head sliders 14. The magnetic head slider 14 has a floating surface 16 and a floating rail (not shown). In operation, the disk rotates in the direction shown by the arrow X, and the magnetic head slider 14 floats with respect to the disk 14 with the floating amount Y and the pitch angle Z. The floating amount Y is approximately 10 nm, for example.

The magnetic head slider 14 comprises a substrate 18 forming a slider body and a magnetic head structure 20 provided on the substrate 18. The magnetic head structure 20 is formed by laminating thin films of several materials. The magnetic head structure 20 has a coil 22 formed on the end of the substrate 18, and a magnetic pole 26 allowing a magnetic flux generated by the coil 22 to be transmitted therethrough and forming a magnetic gap 24. Also, a shield 28 and a reading element (MR element) 30 are arranged on the substrate 18.

When data are written into the disk 12, an electric current is supplied to the coil 22. The electric current flowing through the coil 22 generates a magnetic flux, and the magnetic flux leaking in the magnetic gap 24 of the magnetic pole 26 writes data in the disk 12. Also, when data are read from the disk 12, data is read by the reading element 30. Recently, the amount of the floating of the magnetic head slider 14 has been reduced in order to increase the recording density, and the amount of the floating is ten and several nm, for example.

Figure 3:
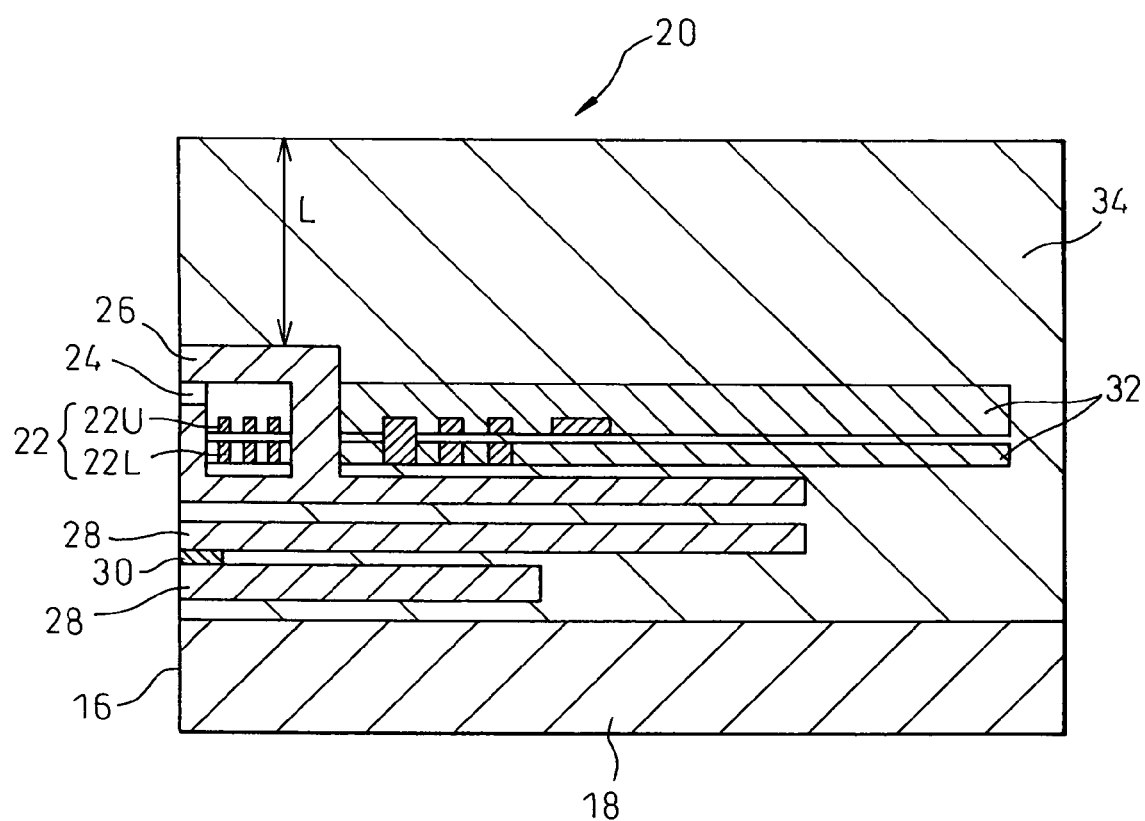
FIG. 3 is a cross-sectional view illustrating the magnetic head structure.

FIG. 3 is a cross-sectional view illustrating the magnetic head structure 20. The substrate 18 corresponds to only a part of the substrate 18 shown in FIGS. 1 and 2. The magnetic head structure 20 has the coil 22 and the magnetic pole 26. The coil 22 is of a two-layered structure comprising an upper coil 22U and a lower coil 22L, and the central portions of the upper coil 22U and the lower coil 22L are connected to each other. Also, two layers of the shield 28 are provided on the substrate 18, and the reading element (MR element) 30 is arranged between the two layers of the shield 28.

Also, the magnetic head structure 20 includes an insulating layer 32 surrounding the coil 22, and a protective layer 34 covering the insulating layer 32 and the magnetic pole 22. The insulating layer 32 comprises a two-layered structure corresponding to the two-layered coil 22 (22U and 22L). These elements are formed by laminating thin films of respective materials. The protective layer 34 has a considerable thickness and is also formed between the above described several layers.

The substrate 18 is made of $Al_2O_3$—TiC, the coil 22 is made of copper, the magnetic pole 26 and the shield 28 are made of a magnetic material such as NiFe, the protective layer 34 is made of alumina, and the insulating layer 32 is made of a resin material such as a photoresist. The whole magnetic head structure 20 is covered by the protective layer 34 such as alumina, and the coil 22 and the insulating layer 32, which have coefficients of thermal expansion different from that of the protective layer 34, are arranged within the magnetic head structure 20. The coefficient of thermal expansion of alumina forming the protective layer 34 is $5.8 \times 10^{-6}$, the coefficient of thermal expansion of copper forming the coil 22 is $17.2 \times 10^{-6}$, the coefficient of thermal expansion of Permalloy as a magnetic material forming the magnetic pole 26 and the shield 28 is $10 \times 10^{-6}$, and the coefficient of thermal expansion of a photoresist forming the insulating layer 32 is $30\text{-}70 \times 10^{-6}$. The coefficient of thermal expansion of copper or a magnetic material is approximately two or three times greater than that of alumina. The coefficient of thermal expansion of photoresist is approximately 10 times greater than that of alumina.

The insulating layer 32 has a volume equal to or greater than a value which is determined with respect to a thickness of the protective layer 34, so that the protrusion of a portion of the floating surface 16 where the magnetic pole 26 is positioned is reduced. In FIG. 3, the insulating layer 32 has a uniform thickness and is formed longer than the region where the coil 22 is provided in the cross-section of FIG. 3. That is, the insulating layer 32 has a volume considerably greater than a volume necessary to insulate the coil 22.

Figure 9:
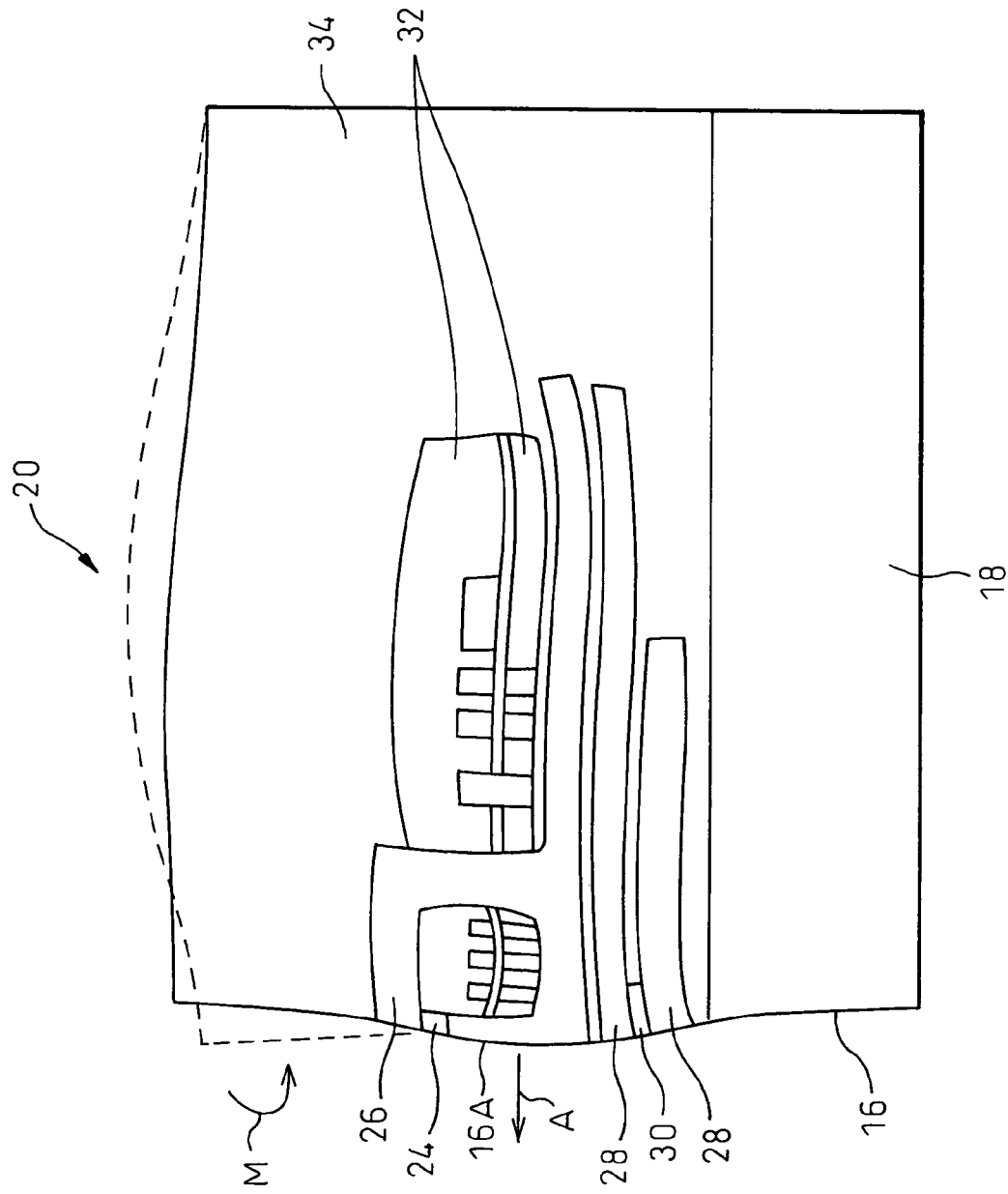
FIG. 9 is a view illustrating a thermal deformation of a magnetic head structure according to the prior art and illustrating the principle of the present invention.

FIG. 9 is a view illustrating a thermal deformation of a magnetic head structure according to the prior art and illustrating the principle of the present invention. The constituent elements of the magnetic head structure are represented by reference numerals identical to those of FIG. 3. The volume of the insulating layer 32 of FIG. 9 is smaller than that of the insulating layer 32 of FIG. 3. FIG. 9 is a view in which the thermal deformation is calculated, using the definite element method. In FIG. 9, it will be understood that a thermal deformation occurs, due to mainly the difference between the coefficient of thermal expansion of the insulating layer 32 and that of the protective layer 34. In particular, the deformation occurs such that a portion 16A of the floating surface 16 near the magnetic pole 26 protrudes to the greatest degree toward the disk 12, as shown by the arrow A. The amount of the floating of the magnetic head slider 14 is about ten and several nm, and if the amount of the protrusion of the portion 16A becomes greater, it can be said that the minimum amount of the floating of the magnetic head slider 14 is substantially reduced, and the portion 16A of the floating surface 16 where the coil 22 is positioned may contact the disk 12.

In the present invention, the protective layer 34 is deformed in a manner as shown by the broken line in FIG. 9, by increasing the volume of the insulating layer more than a certain value, and it is possible to reduce the protrusion of the portion 16A of the floating surface 16 near the magnetic pole 26 in the direction shown by the arrow A. Therefore, the reliability of the operation of the magnetic head structure 20 is further improved.

It will be usually conceived that the amount of the thermal expansion of the insulating layer 32 may increase when the volume of the insulating layer 32 is increased, so that the amount of the protrusion of the portion 16A of the floating surface 16 near the magnetic pole 26 will be increased. The inventors of the present application have found that the expansion of the insulating layer 32 in the high temperature state occurs not only in the direction toward the floating surface 16 but also in the direction transverse to the floating surface 16.

If the volume of the insulating layer 32 is increased, a component of the insulating layer 32, which expands in the direction transverse to the floating surface 16, locally presses upward a part of the protective layer 36 located above the insulating layer 32, so that a moment M, which causes a portion of the protective layer 32 on the side of the floating surface 16 to rotate, occurs. By this moment M, the outer edge of the floating surface 16 (left upper end of the protective layer 34 in FIG. 9), deforms toward the disk 12 and the protrusion of the portion 16A of the floating surface 16 near the magnetic pole 26 toward the disk 12 is restricted.

Therefore, by increasing the volume of the insulating layer 32 having a greater coefficient of thermal expansion, it is possible to reduce the protrusion of the portion 16A of the floating surface 16 near the magnetic pole 26 toward the disk 12. Also, it is necessary to increase the volume of the material of the insulating layer 32, as the thickness of the protective layer 34 covering the insulating layer 32 is greater, in order to deform the protective layer 34 so as to reduce the protrusion of the portion 16A of the floating surface 16 near the magnetic pole 26 toward the disk 12.

Figure 10:
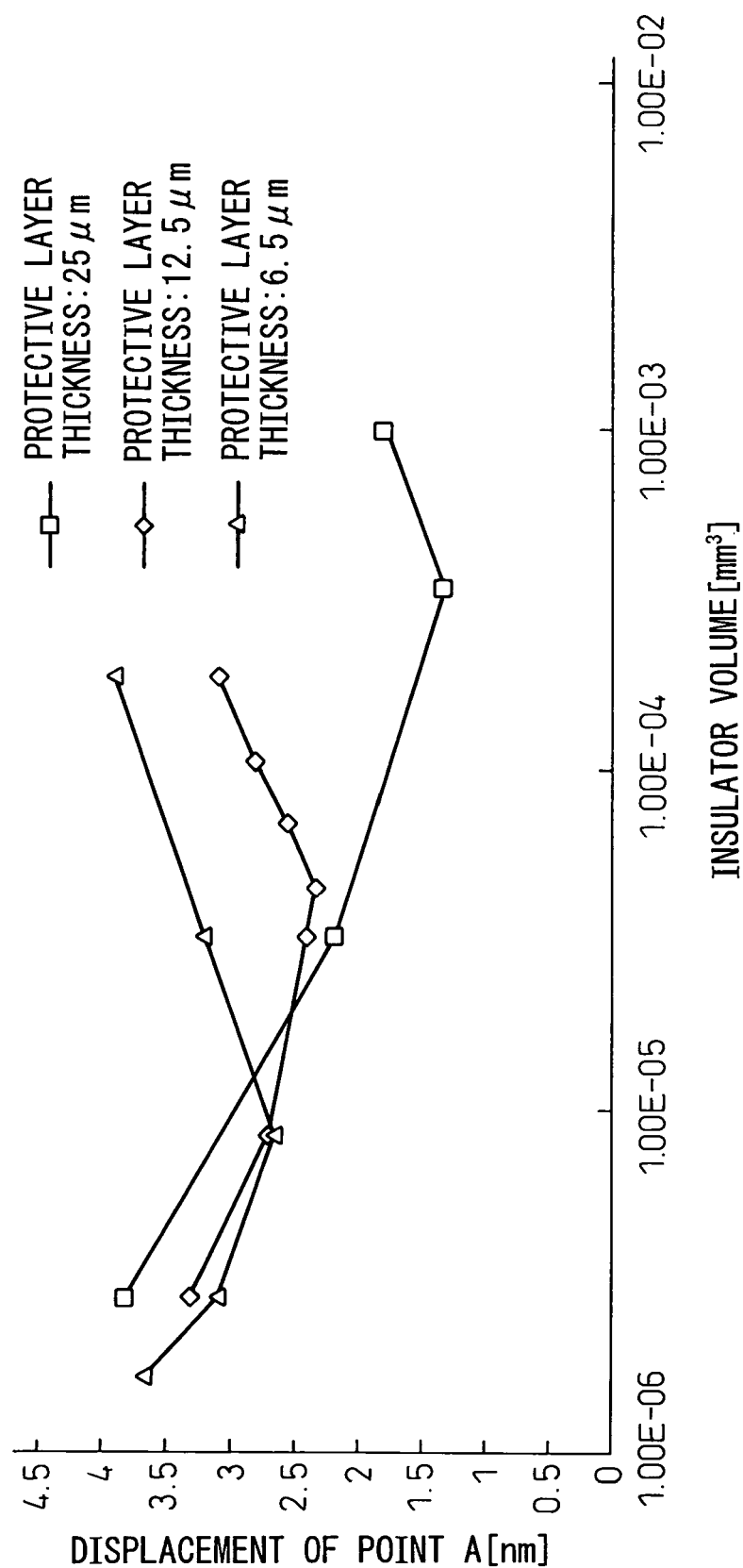
FIG. 10 is a view illustrating the relationship between the volume of the insulating layer and the displacement of the portion of the floating surface near the magnetic pole when the thickness of the protective layer is changed.

FIG. 10 is a view illustrating the relationship between the volume of the insulating layer 32 (insulator volume) and the displacement of the portion 16A of the floating surface 16 near the magnetic pole 26 (displacement of point A) when the thickness of the protective layer 34 is changed. The displacement of the portion 16A is the amount of the protrusion, measured in the direction of the arrow A in FIG. 9. The thicknesses of the protective layer 32 are 6.25 μm, 12.5 μm, and 25 μm. From the result shown in FIG. 10, it will be understood that the amount of the protrusion of the portion 16A has a local minimum value at a certain value of the volume of the protective layer 34. Also, the local minimum value of the protrusion of the portion 16A shifts to the side where the volume of the protective layer 34 becomes greater, as the thickness of the protective layer 34 is greater.

Therefore, the characteristic feature of the present invention is to aim for a reduction of the amount of the protrusion of the portion 16A, using this mechanism. However, if the volume of the insulating layer (photoresist) 32 is too large, the effect of reducing the amount of the protrusion of the portion 16A cannot be expected, and it is important to set the volume of the insulating layer 32 within the certain range including the local minimum value, in accordance with the thickness of the protective layer 34.

As a result of analyzing the result of FIG. 10, it has been found preferable that the volume of the insulating layer 32 is in the range of 10 times to 40 times of a value defined by the cube of L, where L is the thickness of the protective layer 34 and is smaller than 25 μm. In this case, the thickness L is a thickness of a portion of the protective layer 34 above the magnetic pole 26, as shown in FIG. 3. Note that this result is optimum in the magnetic head structure 20 in which the thickness of the protective layer 34 is smaller than 25 μm.

Figure 11:
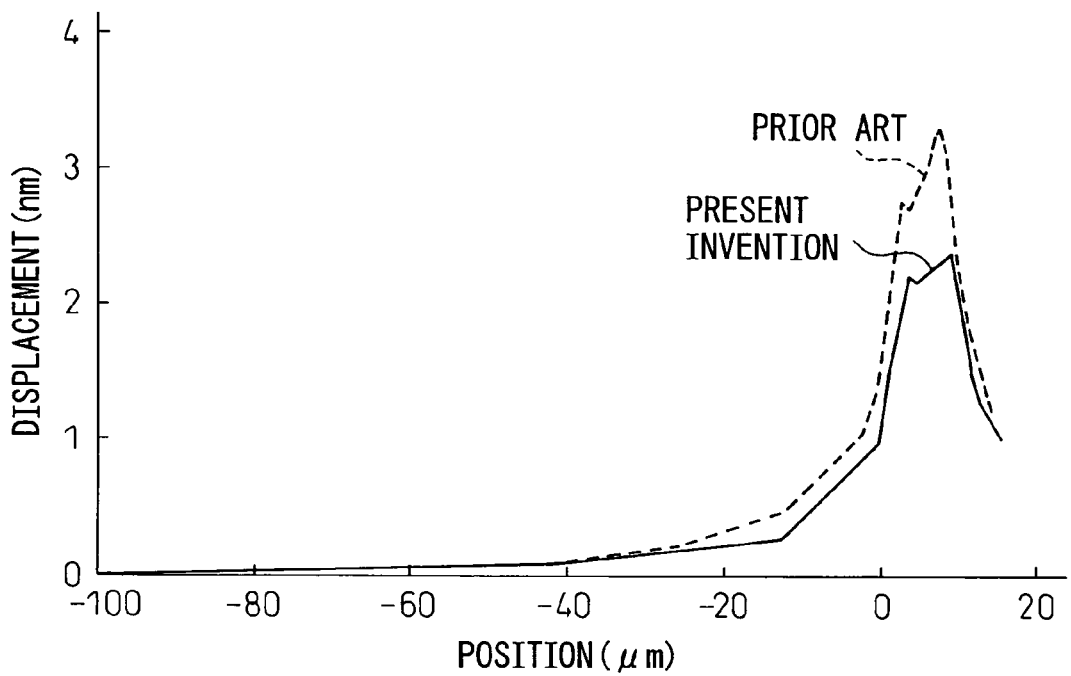
FIG. 11 is a view illustrating the displacement of the portion of the floating surface of the present invention and that of the prior art.

FIG. 11 is a view illustrating the displacement of the portion of the floating surface of the present invention and that of the prior art. The magnetic head structure 20 of the present invention is constructed such that the thickness of the protective layer 34 is 12.5 μm and the volume of the insulating layer 32 is 3.26E-05 $mm^3$. The conventional magnetic head structure is constructed such that the thickness of the protective layer 34 is 12.5 μm and the volume of the insulating layer 32 is 2.85E-06 mm$^3$ (standard volume of the insulating layer arranged around the coil 22). According to the present invention, the amount of the protrusion of the portion 16A is reduced by approximately 30%.

In increasing the volume of the insulating layer 32, it is not necessary to intensively arrange the material of the insulating layer 32 at one portion, but it is possible to arrange the material of the insulating layer 32 into a plurality of divided portions. FIGS. 4 to 8 show examples of the magnetic head structure in which the material of the insulating layer 32 is differently arranged and the volume of the insulating layer 32 is increased.

Figure 4:
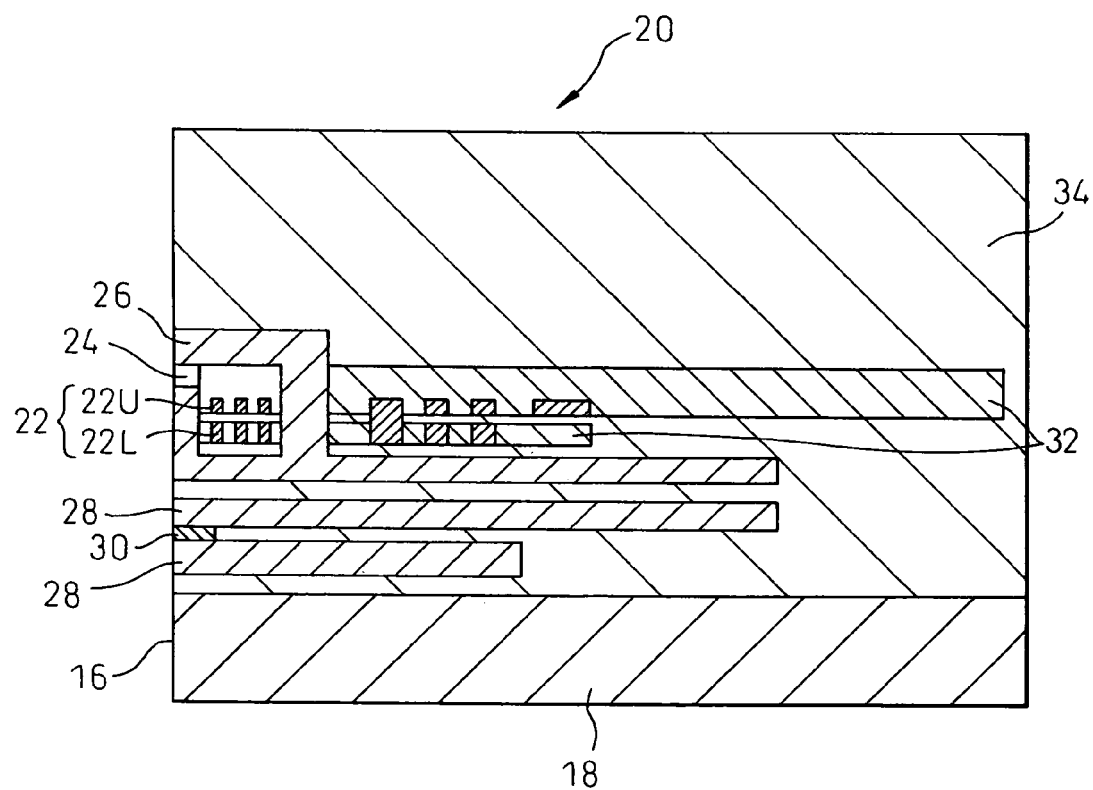
FIG. 4 is a cross-sectional view illustrating a modified example of the magnetic head structure.

FIG. 4 is a cross-sectional view of the magnetic head structure. In FIG. 4, the volume of the upper part of the insulating layer 32 surrounding the upper coil 22U is increased, and the volume of the lower part of the insulating layer 32 surrounding the lower coil 22L is maintained unchanged with respect to the conventional one.

Figure 5:
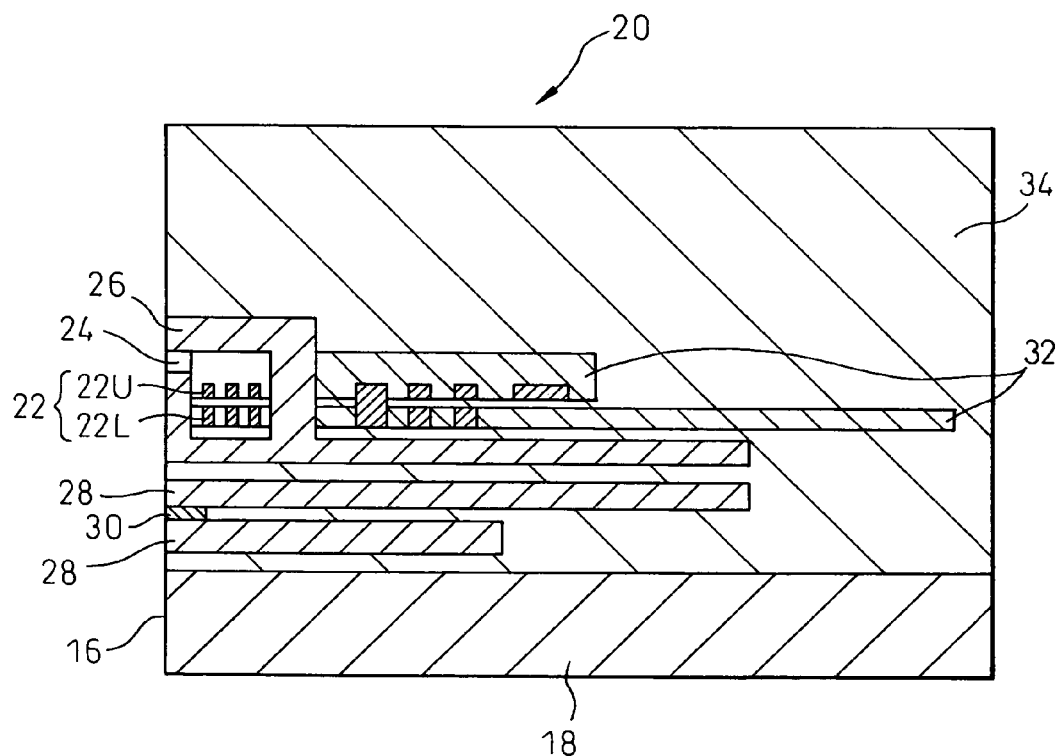
FIG. 5 is a cross-sectional view illustrating a modified example of the magnetic head structure.

FIG. 5 is a cross-sectional view of the magnetic head structure. In FIG. 5, the volume of the upper part of the insulating layer 32 surrounding the upper coil 22U is maintained unchanged with respect to the conventional one, and the volume of the lower part of the insulating layer 32 surrounding the lower coil 22L is increased.

Figure 6:
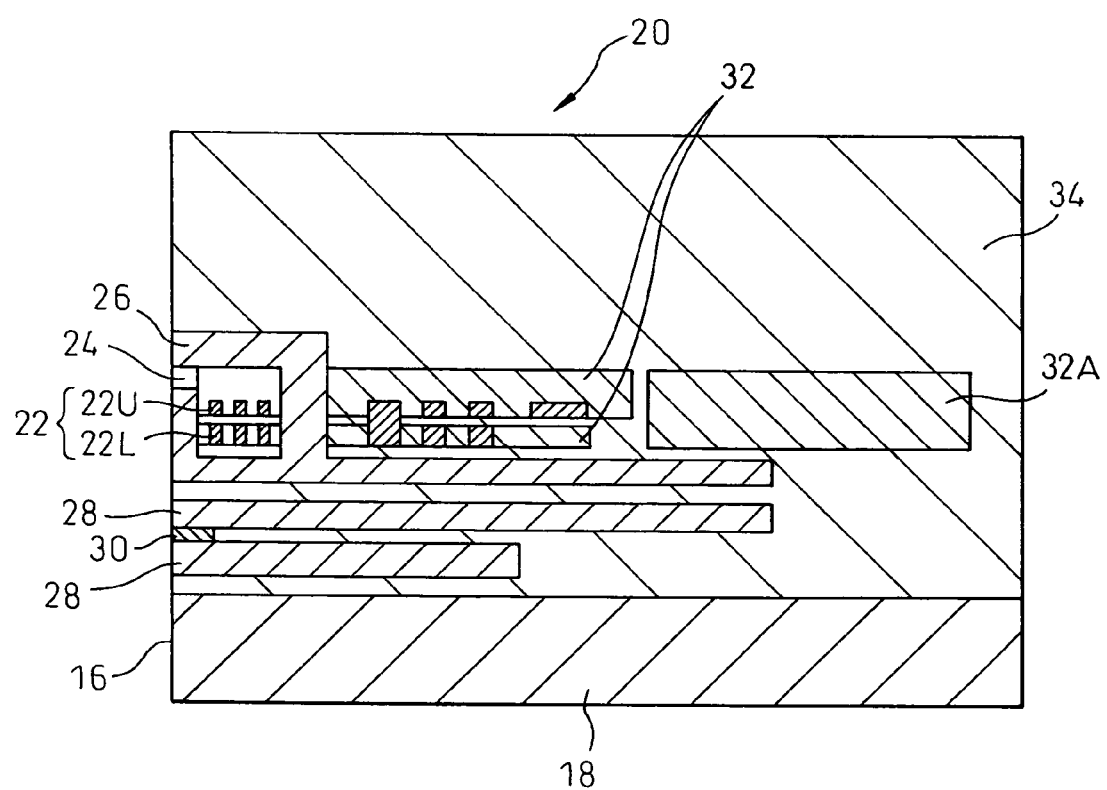
FIG. 6 is a cross-sectional view illustrating a modified example of the magnetic head structure.

FIG. 6 is a cross-sectional view of the magnetic head structure. In FIG. 6, the volume of the upper part of the insulating layer 32 surrounding the upper coil 22U and the volume of the lower part of the insulating layer 32 surrounding the lower coil 22L are maintained unchanged with respect to conventional ones, and an additional insulating layer 32A is provided in a plane substantially coplanar with the plane of the insulating layer 32.

Figure 7:
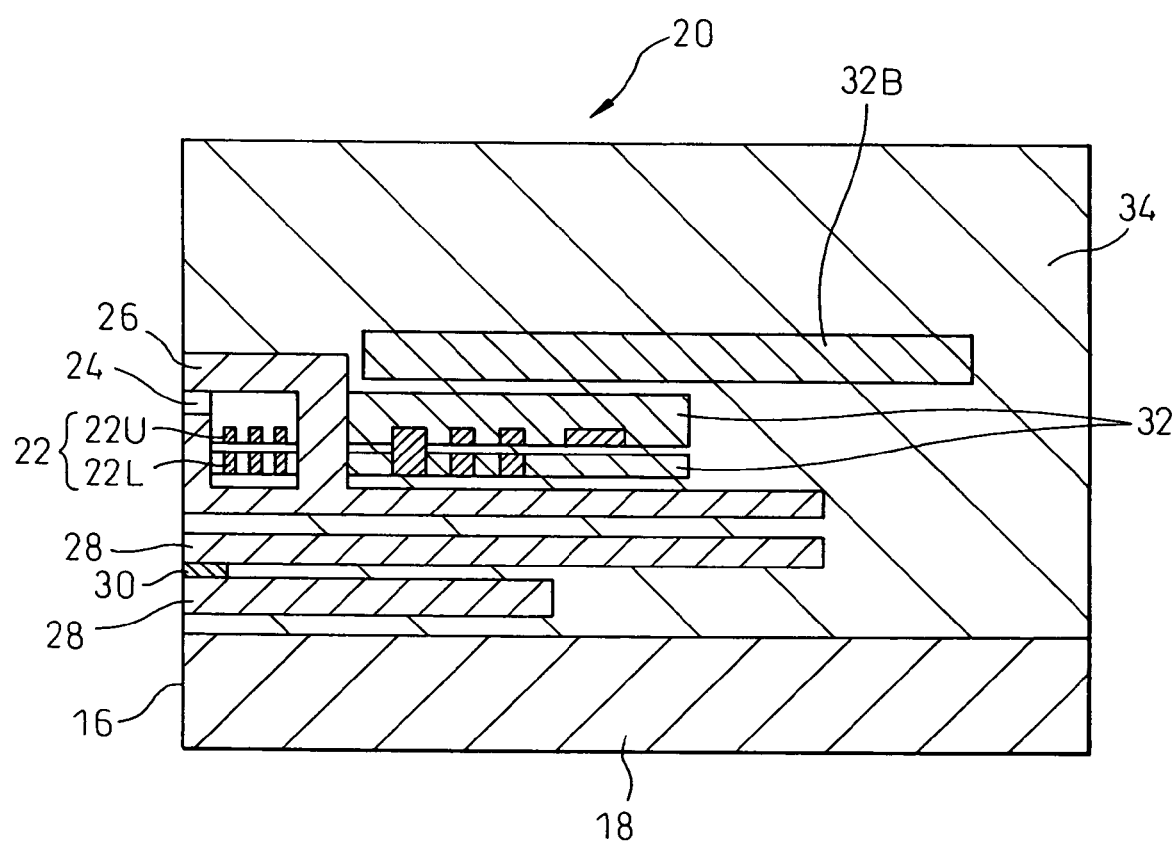
FIG. 7 is a cross-sectional view illustrating a modified example of the magnetic head structure.

FIG. 7 is a cross-sectional view of the magnetic head structure. In FIG. 7, the volume of the upper part of the insulating layer 32 surrounding the upper coil 22U and the volume of the lower part of the insulating layer 32 surrounding the lower coil 22L are maintained unchanged with respect to the conventional ones, and an additional insulating layer 32B is provided above the insulating layer 32. The additional insulating layer 32A or 32B does not directly insulate the coil 22, but is made from the same material as the insulating layer 32 and has the effect similar to that when the volume of the insulating layer 32 is increased.

Figure 8:
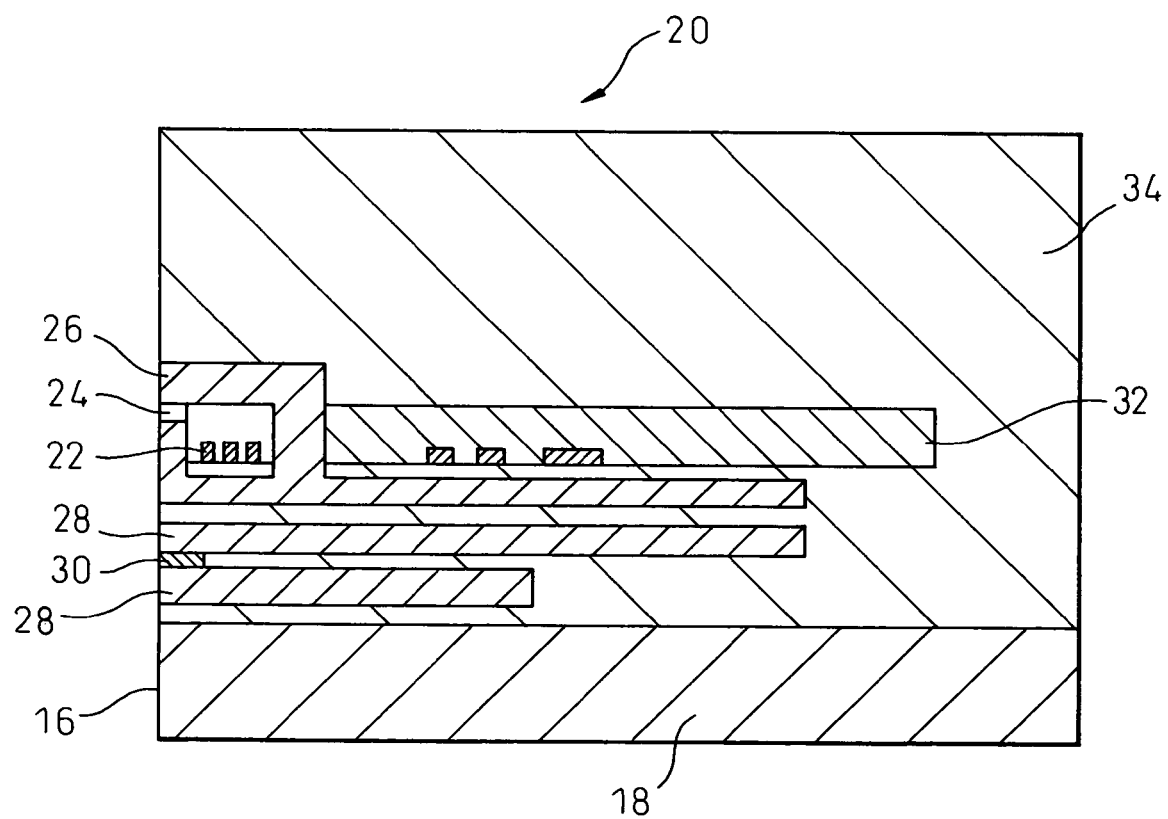
FIG. 8 is a cross-sectional view illustrating a modified example of the magnetic head structure.

FIG. 8 is a cross-sectional view of the magnetic head structure. In FIG. 8, the single layer coil 22 is provided, and the volume of the single layer insulating layer 32 surrounding the coil 22U is increased. In the case of the single layer coil 22 too, an effect similar to that of the multi-layered coil 22 is obtained.

Figure 12:
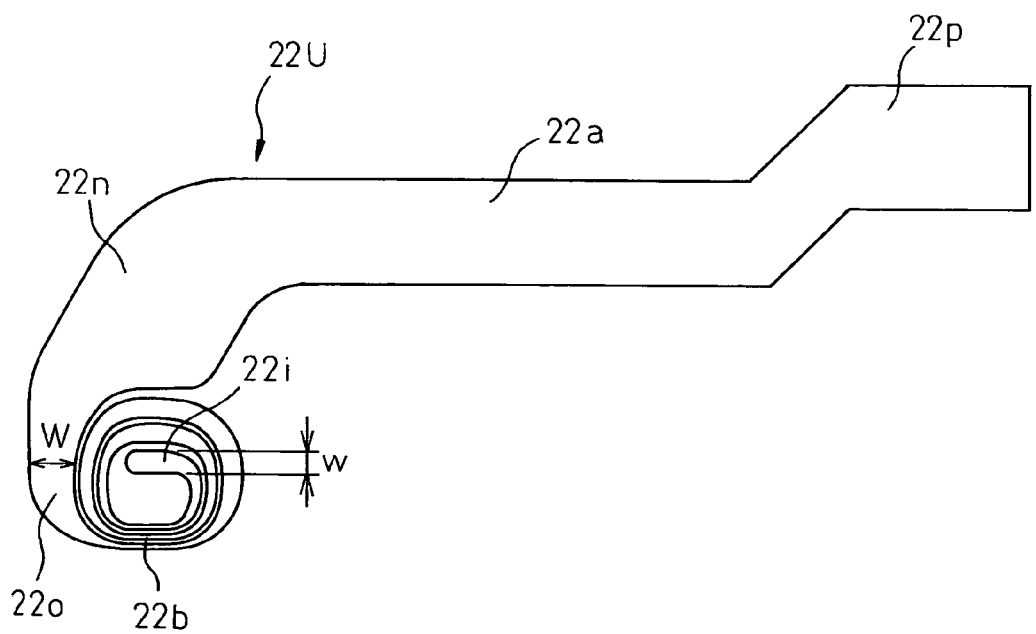
FIG. 12 is a view illustrating the upper coil of the two-layered coil.
Figure 13:
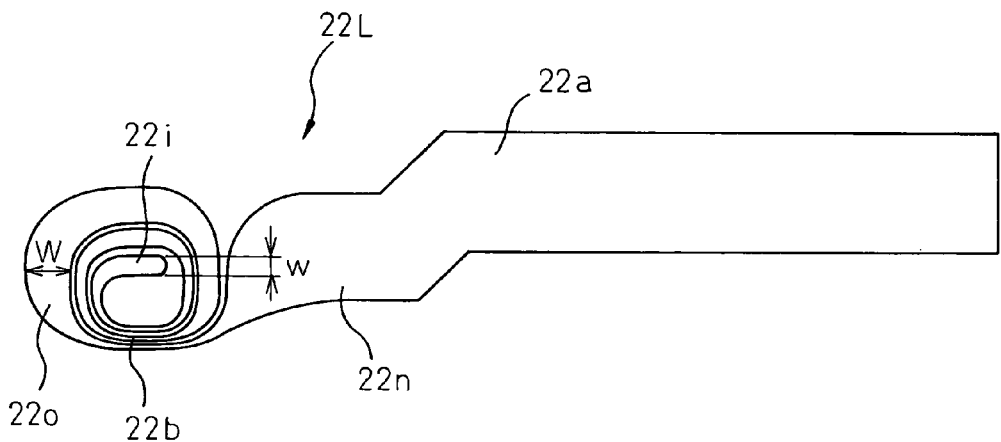
FIG. 13 is a view illustrating the lower coil of the two-layered coil.

FIG. 12 is a view illustrating the upper coil of the two-layered coil, and FIG. 13 is a view illustrating the lower coil of the two-layered coil. The inner end of the upper coil 22U and the inner end of the lower coil 22L are connected to each other. The upper coil 22U and the lower coil 22L of FIGS. 12 and 13 can be used as the upper coil 22U and the lower coil 22L of FIGS. 3 to 7, or they can be used as the conventional two-layered coil.

Each of the upper coil 22U and the lower coil 22L has a connecting line 22a and a coil portion 22b. The coil portion 22b has an outer coil part 22i and an outer coil part 22o. Each of the upper coil 22U and the lower coil 22L is formed such that the width W of the outer coil part 22o is greater than two times the width w of the inner coil part 22i.

Also, the width of a portion 22n of the connecting line 22a near the outer coil part 22o is greater than the width of the outer coil part 22o. In particular, in the upper coil 22U, the width of a portion 22n of the connecting line 22a near the outer coil part 22o is greater than the width of other portion 22p of the connecting line 22a.

In this arrangement, the coil 22 has a wider portion (the outer coil part 22o), and the resistance of the coil 22 is reduced. As the resistance of the coil 22 is reduced, the amount of the heat generated by the coil 22 is reduced and, as a result, the amount of the expansion of the insulating layer 32 is reduced and the thermal deformation of the magnetic head structure 20 is also reduced. Therefore, it is possible to reduce the protrusion of the portion 16A of the floating surface 16 at which the coil 22 is positioned (see FIG. 9).

In this manner, when an electric current is supplied to the coil 22, the coil 22 generates heat due to the resistance thereof, the temperature rises and, as a result, the portion 16A protrudes. The amount of the protrusion of the portion 16A when an electric current is supplied to the coil 22 is proportional to the amount of the generated heat (temperature rise). Therefore, the reduction of the resistance of the coil 22 leads to the reduction of the amount of the generated heat, i.e., to the reduction of the amount of the protrusion. In the present invention, the resistance of the coil 22 is reduced, by adopting such a structure that the connecting line 22a and the outer coil part 22o of the coil 22 are widely spread.

In the embodiment of the present invention, the width of the outer coil part 22o is greater than two times of the width of the inner coil part 22i, and the size of the connecting line 22a is maintained substantially constant from its leading end to a position near the connecting point to the outer coil part 22o, and the size of the connecting line 22a is enlarged at a position just before the connecting point to the outer coil part 22o.

Figure 14:
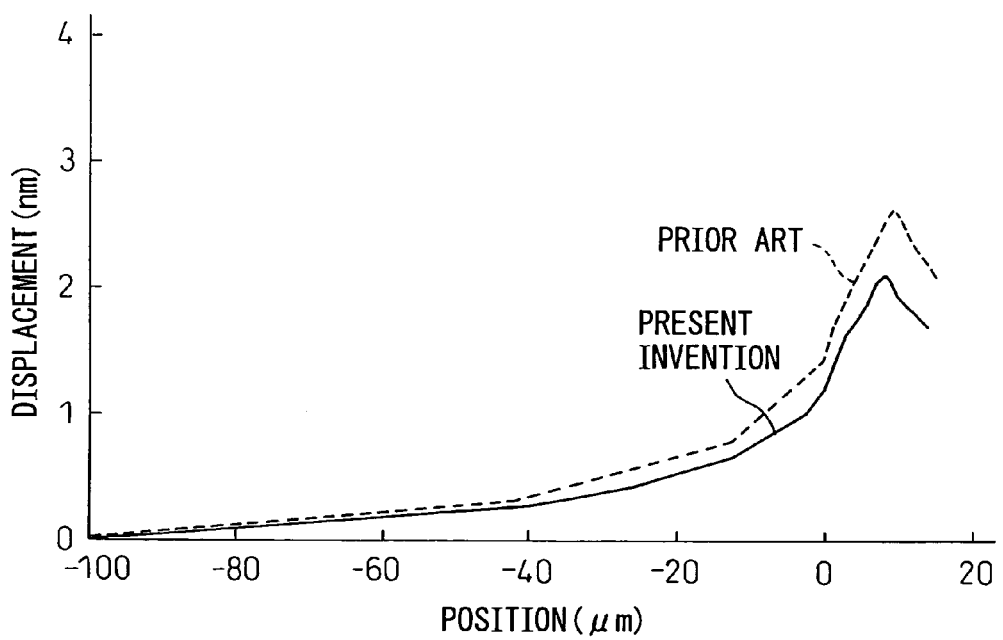
FIG. 14 is a view illustrating the displacement of the portion of the floating surface of the present invention and that of the prior art.

FIG. 14 is a view illustrating the displacement of the portion of the floating surface of the present invention and that of the prior art. When an electric current of DC 60 mA is supplied, the maximum temperature of embodiment of the present invention in which coil 22 is enlarged is reduced by 21%, compared with that of the prior art in which coil 22 is not enlarged. An experiment was carried out, and the results obtained are described in Table 1 below.

TABLE 1

|  | No Coil Enlargement | Coil Enlargement |
|---|---|---|
| Resistance (Ω) | 3.0 | 2.4 |
| Amount of Generated Heat (mW) | 10.8 | 8.6 |
| Maximum Rising Temperature (° C.) | 13.0 | 10.3 |

Figure 15:
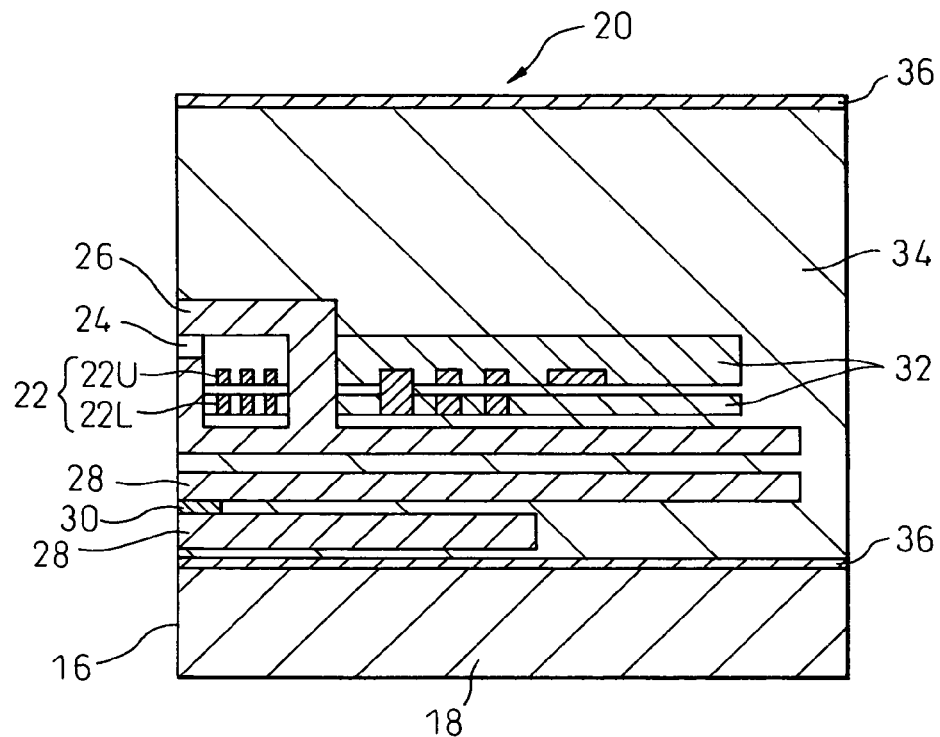
FIG. 15 is a cross-sectional view illustrating the magnetic head structure according to another embodiment of the present invention.

FIG. 15 is a cross-sectional view illustrating the magnetic head structure according to another embodiment of the present invention. As in the magnetic head structure 20 of the former embodiment, the magnetic head structure 20 of this embodiment has a coil 22, a magnetic pole 26 allowing a magnetic flux generated by the coil 22 to be transmitted therethrough and forming a magnetic gap 24, an insulating layer 32 surrounding the coil 22, and a protective layer 34 covering the insulating layer 32 and the magnetic pole 26. Also, a two-layered shield 28 is arranged on the substrate 18 and a reading element (MR element) 30 is arranged between two layers of the shield 28. The coil 22 is formed on the substrate 18 via the shield 28 and a part of the protective layer 34.

Further, the magnetic head structure 20 comprises at least one material layer 36 arranged in or on the protective layer 34 and having coefficient of thermal expansion smaller than that of the protective layer 34. The material layer 36 having smaller coefficient of thermal expansion is preferably arranged in one continuous layer, rather than being discontinuously arranged in one layer. In FIG. 15, one material layer 36 having smaller coefficient of thermal expansion is arranged on the surface of the substrate 18. In this case, a part of the protective layer 34 is formed on the material layer 36 having smaller coefficient of thermal expansion, and the shield 28 is formed on the part of the protective layer 34. Also, another one material layer 36 having smaller coefficient of thermal expansion is arranged on the surface of the protective layer 34. For example, the material layer 36 having smaller coefficient of thermal expansion comprises Invar. Alternatively, the material layer 36 having smaller coefficient of thermal expansion comprises a material having smaller coefficient of thermal expansion such as aluminum nitride (AlN), or a composite structure of an insulating material and Invar.

The thermal expansion of the material layer 36 having smaller coefficient of thermal expansion is small when the temperature rises because the amount of thermal expansion is small, and suppresses the thermal expansion of the insulating layer 32 in the direction perpendicular to the floating surface 16, whereby it is possible to reduce the protrusion of the portion 16A of the floating surface 16 near the magnetic pole. That is, by providing the material layer 36 having smaller coefficient of thermal expansion, the insulating layer 32 the amount of the thermal expansion of which is greater is prevented from expanding to the greater extent in the direction perpendicular to the floating surface 16, and the protrusion of of the portion 16A of the floating surface 16 near the magnetic pole is reduced. The insulating layer 32 can expand in the direction parallel to the floating surface 16.

Figure 18:
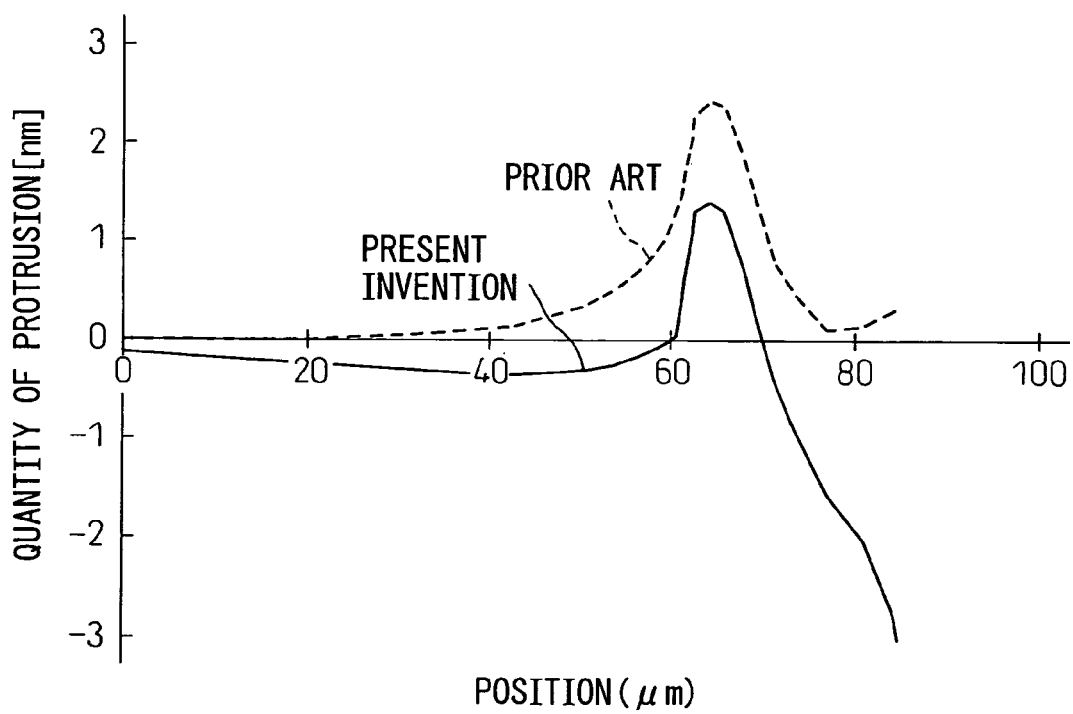
FIG. 18 is a view illustrating the displacement of the portion of the floating surface of the present invention and that of the prior art.

FIG. 18 is a view illustrating the displacement of the portion of the floating surface of the present invention and that of the prior art. According to the embodiment of the present invention, the displacement (the amount of the protrusion) of the portion 16A of the floating surface 16 near the magnetic pole is greatly reduced, compared with that of the prior art.

Figure 16:
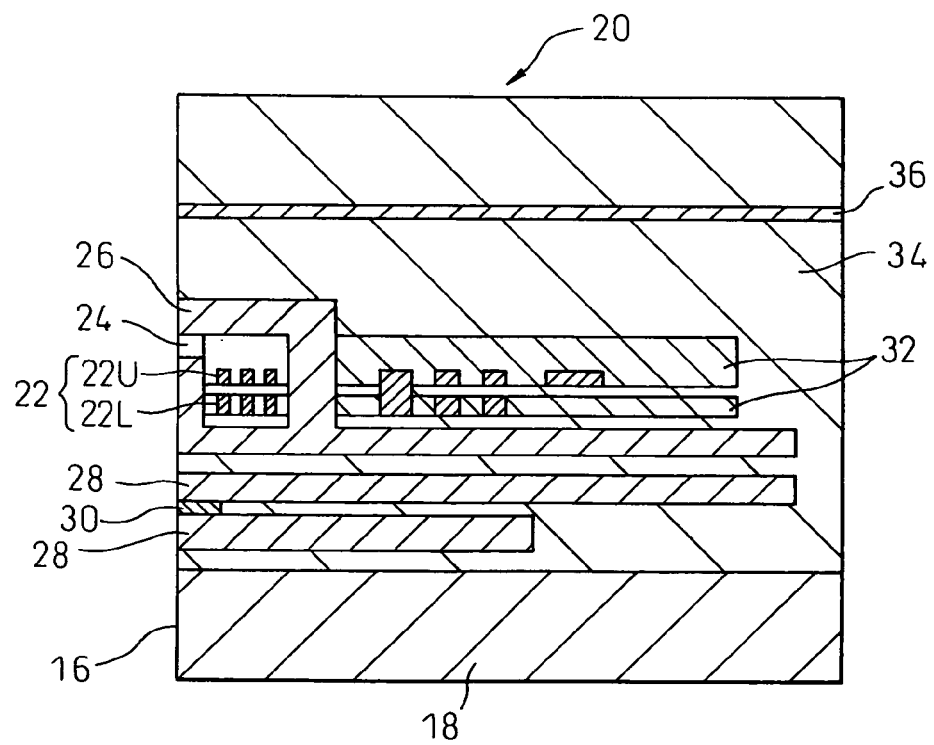
FIG. 16 is a cross-sectional view illustrating a modified example of the magnetic head structure.

FIG. 16 is a cross-sectional view illustrating a modified example of the magnetic head structure. The magnetic head structure of FIG. 16 is similar to that of FIG. 15, except for the material layer 36 having smaller coefficient of thermal expansion. In FIG. 16, the material layer 36 having smaller coefficient of thermal expansion is arranged within the protective layer. The operation and the effect of this example are similar to those of the example of FIG. 15.

Figure 17:
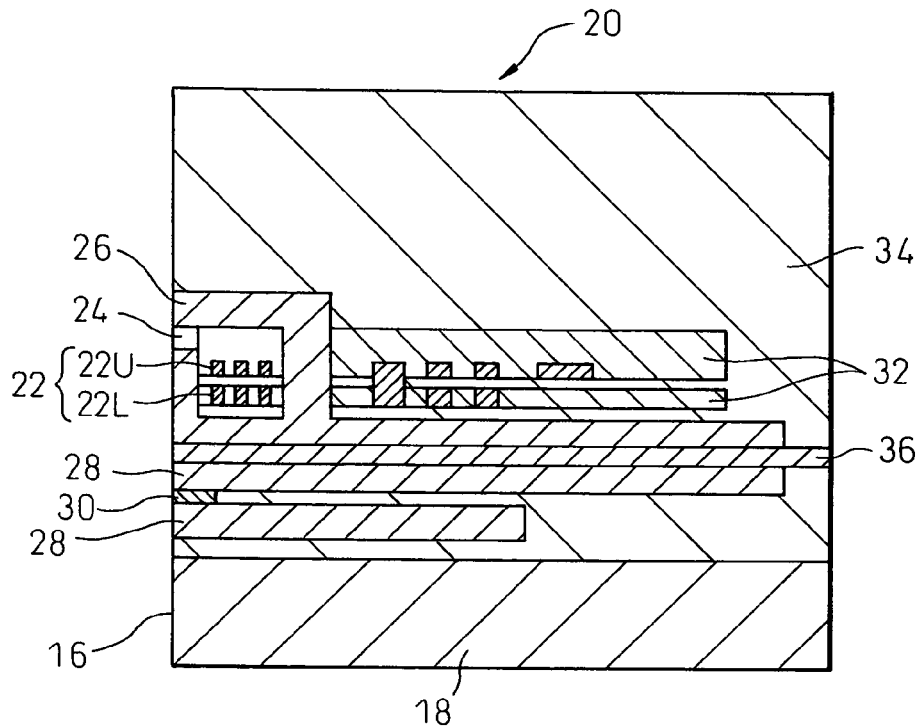
FIG. 17 is a cross-sectional view illustrating a modified example of the magnetic head structure.

FIG. 17 is a cross-sectional view illustrating a modified example of the magnetic head structure. The magnetic head structure of FIG. 16 is similar to that of FIG. 15, except for the material layer 36 having smaller coefficient of thermal expansion. In FIG. 17, the material layer 36 having smaller coefficient of thermal expansion is arranged between the magnetic pole 26 and the upper shield 28. The operation and the effect of this example are similar to those of the example of FIG. 15.

In this manner, the material layer 36 having smaller coefficient of thermal expansion is arranged on the surface of the protective layer 34. Alternatively, the material layer 36 having smaller coefficient of thermal expansion is arranged within the protective layer. Alternatively, the material layers 36 having smaller coefficient of thermal expansion are arranged on the surface of the protective layer 34 and between the substrate 18 and the protective layer 34. Alternatively, the material layer 36 having smaller coefficient of thermal expansion is arranged on the surface of the protective layer 34 and between the magnetic pole 26 and the shield 28. Alternatively, the material layer 36 having smaller coefficient of thermal expansion is arranged at any position within the protective layer 34 as a layer parallel to the insulating layer 32.

The invention claimed is:

1. A magnetic head structure comprising:
   a coil;
   a magnetic pole allowing a magnetic flux generated by the coil to be transmitted therethrough and forming a magnetic gap;
   an insulating layer surrounding the coil; and
   a protective layer covering the insulating layer and the magnetic pole;
   wherein a volume of the insulating layer having a coefficient of thermal expansion larger than that of the protective layer is adapted to be increased as a thickness of the protective layer becomes greater, so that the protrusion of the portion of a floating surface near the magnetic pole can be reduced.

2. The magnetic head structure according to claim 1, wherein the volume of the insulating layer is in the range of 10 times to 40 times of a value defined by the cube of L, where L is the thickness of the protective layer and is smaller than 25 mm.

3. The magnetic head structure according to claim 1, wherein the insulating layer comprises a layer surrounding the coil and a layer arranged differently from the layer surrounding the coil.

* * * * *

UNITED STATES PATENT AND TRADEMARK OFFICE
CERTIFICATE OF CORRECTION

PATENT NO.        : 7,414,810 B2                                   Page 1 of 1
APPLICATION NO. : 10/925564
DATED             : August 19, 2008
INVENTOR(S)       : Aoki et al.

It is certified that error appears in the above-identified patent and that said Letters Patent is hereby corrected as shown below:

On the Face of the Patent:

In the first column, No. (75) Inventors:    Please delete the following inventor:
                                            Hiroshi Maeda, Kawasaki (JP)

Signed and Sealed this

Thirtieth Day of June, 2009

JOHN DOLL
*Acting Director of the United States Patent and Trademark Office*